US 007660270 B2

(12) United States Patent
Leonard et al.

(10) Patent No.: US 7,660,270 B2
(45) Date of Patent: Feb. 9, 2010

(54) COMPUTER SYSTEM AND METHOD USING EFFICIENT MODULE AND BACKPLANE TILING TO INTERCONNECT COMPUTER NODES VIA A KAUTZ-LIKE DIGRAPH

(75) Inventors: Judson S. Leonard, Newton, MA (US); Matthew H. Reilly, Stow, MA (US); Lawrence C. Stewart, Wayland, MA (US); Washington Taylor, Cambridge, MA (US)

(73) Assignee: SiCortex, Inc., Maynard, MA (US)

( * ) Notice: Subject to any disclaimer, the term of this patent is extended or adjusted under 35 U.S.C. 154(b) by 426 days.

(21) Appl. No.: 11/594,416

(22) Filed: Nov. 8, 2006

(65) Prior Publication Data

US 2008/0126571 A1    May 29, 2008

(51) Int. Cl.
*H04L 12/28* (2006.01)
(52) U.S. Cl. .................. 370/255; 370/254; 370/203
(58) Field of Classification Search .............. None
See application file for complete search history.

(56) References Cited

U.S. PATENT DOCUMENTS

| 5,134,690 | A | 7/1992 | Samatham |
| 5,513,371 | A | 4/1996 | Cypher et al. |
| 6,721,311 | B1 * | 4/2004 | Samsudin et al. ........... 370/369 |
| 2006/0056308 | A1 | 3/2006 | Gusat et al. |

OTHER PUBLICATIONS

Samatham, M. and Pradhan, D. "The De Bruijn Multiprocessor Network: A versatile Parallel Processing and Sorting Network for VLSI". IEEE Transactions on Computers, vol. 38, No. 4, Apr. 1989.*
Panchapakesan, G. and Sengupta, A. "On Multihop Optical Network Topology using Kautz Digraphs". IEEE Xplore. University of South Carolina. Copyright 1995 IEEE.*
Samatham, M. and Pradhan, D. "The De Bruijn Multiprocessor Netowrk: A Versatile Parallel Processing and Sorting Network for VLSI". IEEE Transactions on Computers, vol. 38, No. 4, Apr. 1989.*
Liu, Guoping and Lee, Y. "Optimal Routing Algorithm for Generalized de Bruijn Digraphs". Parallel Processing, 1993. ICPP 1993. International Conference on Parallel Processing. vol. 3, Aug. 16-20, 1993, pp. 167-174.*
Smit, "An Algorithm for Generating Node Disjoint Routes in Kautz Diagraphs," IEEE, 1991, pp. 102-107.
International Search Report for PCT/US07/82851 mailed Mar. 26, 2008.

* cited by examiner

*Primary Examiner*—Ayaz R Sheikh
*Assistant Examiner*—Peter Chau
(74) *Attorney, Agent, or Firm*—Chapin IP Law, LLC

(57) ABSTRACT

Computer systems and methods using efficient module and backplane tiling to interconnect computer nodes via a Kautz-like digraph. A multinode computing system includes a large plurality of computing nodes interconnected via a Kautz topology having order O, diameter n, and degree k. The order equals $(k+1)k^{n-1}$. The interconnections from a node x to a node y in the topology satisfy the relationship $y=(-x*k-j)$ mod O, where $1 \leq j \leq k$, and the computing nodes are arranged onto a plurality of modules. Each module has an equal plurality of computing nodes on it. A majority of the inter-node connections are contained on the plurality of modules and a minority of the inter-node connections are inter-module connections. Inter-module connections are routed among modules in parallel on an inter-module connection plane.

11 Claims, 8 Drawing Sheets

COMPUTER SYSTEM AND METHOD USING EFFICIENT MODULE AND BACKPLANE TILING TO INTERCONNECT COMPUTER NODES VIA A KAUTZ-LIKE DIGRAPH

CROSS-REFERENCE TO RELATED APPLICATIONS

This application is related to the following U.S. patent applications, the contents of which are incorporated herein in their entirety by reference:

U.S. patent application Ser. No. 11/335,421, filed Jan. 19, 2006, entitled SYSTEM AND METHOD OF MULTI-CORE CACHE COHERENCY;

U.S. patent application Ser. No. 11/594,426, filed on an even date herewith, entitled SYSTEM AND METHOD FOR PREVENTING DEADLOCK IN RICHLY-CONNECTED MULTI-PROCESSOR COMPUTER SYSTEM USING DYNAMIC ASSIGNMENT OF VIRTUAL CHANNELS;

U.S. patent application Ser. No. 11/594,421, filed on an even date herewith, entitled LARGE SCALE MULTI-PROCESSOR SYSTEM WITH A LINK-LEVEL INTERCONNECT PROVIDING IN-ORDER PACKET DELIVERY;

U.S. patent application Ser. No. 11/594,442, filed on an even date herewith, entitled MESOCHRONOUS CLOCK SYSTEM AND METHOD TO MINIMIZE LATENCY AND BUFFER REQUIREMENTS FOR DATA TRANSFER IN A LARGE MULTI-PROCESSOR COMPUTING SYSTEM;

U.S. patent application Ser. No. 11/594,427, filed on an even date herewith, entitled REMOTE DMA SYSTEMS AND METHODS FOR SUPPORTING SYNCHRONIZATION OF DISTRIBUTED PROCESSES IN A MULTIPROCESSOR SYSTEM USING COLLECTIVE OPERATIONS;

U.S. patent application Ser. No. 11/594/423, filed on an even date herewith, entitled COMPUTER SYSTEM AND METHOD USING A KAUTZ-LIKE DIGRAPH TO INTERCONNECT COMPUTER NODES AND HAVING CONTROL BACK CHANNEL BETWEEN NODES;

U.S. patent application Ser. No. 11/594,420, filed on an even date herewith, entitled SYSTEM AND METHOD FOR ARBITRATION FOR VIRTUAL CHANNELS TO PREVENT LIVELOCK IN A RICHLY-CONNECTED MULTI-PROCESSOR COMPUTER SYSTEM;

U.S. patent application Ser. No. 11/594,441, filed on an even date herewith, entitled LARGE SCALE COMPUTING SYSTEM WITH MULTI-LANE MESOCHRONOUS DATA TRANSFERS AMONG COMPUTER NODES;

U.S. patent application Ser. No. 11/594,405, filed on an even date herewith, entitled SYSTEM AND METHOD FOR COMMUNICATING ON A RICHLY CONNECTED MULTI-PROCESSOR COMPUTER SYSTEM USING A POOL OF BUFFERS FOR DYNAMIC ASSOCIATION WITH A VIRTUAL CHANNEL;

U.S. patent application Ser. No. 11/594,443, filed on an even date herewith, entitled RDMA SYSTEMS AND METHODS FOR SENDING COMMANDS FROM A SOURCE NODE TO A TARGET NODE FOR LOCAL EXECUTION OF COMMANDS AT THE TARGET NODE;

U.S. patent application Ser. No. 11/594,447, filed on an even date herewith, entitled SYSTEMS AND METHODS FOR REMOTE DIRECT MEMORY ACCESS TO PROCESSOR CACHES FOR RDMA READS AND WRITES; and U.S. patent application Ser. No. 11/594,446, filed on an even date herewith, entitled SYSTEM AND METHOD FOR REMOTE DIRECT MEMORY ACCESS WITHOUT PAGE LOCKING BY THE OPERATING SYSTEM.

BACKGROUND OF THE INVENTION

1. Field of the Invention

The present invention relates to massively parallel computing systems and, more specifically, to computing systems in which computing nodes are interconnected via a Kautz-like topology and with an efficient tiling.

2. Discussion of Related Art

Massively parallel computing systems have been proposed for scientific computing and other compute-intensive applications. The computing system typically includes many nodes, and each node may contain several processors. Various forms of interconnect topologies have been proposed to connect the nodes, including Hypercube topologies, butterfly and omega networks, tori of various dimensions, fat trees, and random networks.

One problem that has been observed with certain architectures is the issue of scalability. That is, due to inherent limitations, certain architectures are not easily scalable in any practical way. For example, one cannot simply add processing power by including another module of computing nodes into the system, or more commonly, the expense and/or performance of the network becomes unacceptable as it grows larger. Moreover, different sized systems might need totally different module designs. For example, hypercube topologies had nodes in which the number of ports or links was dependent on the overall size of the system. Thus a node made for one size system could not be used, as a general matter, on a system with a different size.

Another problem that has been observed is that of routing the connections among nodes. Large systems typically cannot be fully connected because of inherent difficulty in routing. Thus switching architectures have been proposed, but these introduce latency from the various "hops" among nodes that may be necessary for two arbitrary nodes to communicate with one another. Reducing this latency is desirable but has proven difficult.

SUMMARY

The invention provides computer systems and methods using efficient module and backplane tiling to interconnect computer nodes via a Kautz-like digraph.

Under one aspect of the invention, a multinode computing system includes a large plurality of computing nodes interconnected via a Kautz topology having order O, diameter n, and degree k. The order equals $(k+1)k^{n-1}$. The interconnections from a node x to a node y in the topology satisfy the relationship $y=(-x*k-j) \mod O$, where $1 \leq j \leq k$, and the computing nodes are arranged onto a plurality of modules. Each module has an equal plurality of computing nodes on it.

Under another aspect of the invention, a majority of the inter-node connections are contained on the plurality of modules and a minority of the inter-node connections are inter-module connections.

Under another aspect of the invention, the amount of inter-node connections contained on the plurality of modules is a substantially optimal amount.

Under another aspect of the invention, a subset of the inter-node connections are inter-module connections and the subset are routed among modules in parallel on an inter-module connection plane.

Under another aspect of the invention, each module has $k^m$ nodes, and each node on the module can be assigned a label $d_1 \ldots d_m \in Z_k^m$ such that inter-node connections that are intra-module correspond to a subset of the edges $(d_1 \ldots d_m, d_2 \ldots d_{m+1})$ of a de Bruijn graph of diameter m and degree k, subject to the condition that there are no directed closed loops formed from the inter-node connections on a module.

Under another aspect of the invention, the $d_i$'s are expressed as a function of the node labels the $s_0 \ldots s_n$ of the Kautz graph through $$d_i = f(c_{i+n-m}, c_i)$$

wherein f(x,y) is a function which for fixed X acts a permutation on $Z_k$ through $y \to f(X,y)$ and which for fixed Y acts as a permutation on $Z_k$ through $x \to f(x,Y)$ and where $c_i$'s encode the Kautz coordinates $s_i$ through $$c_i = s_i - s_{i-1} - 1 \bmod (k+1)$$

Under another aspect of the invention, f(x,y) equals x+y mod k, or f(x,y) equals x−y mod k.

Under other aspects of the invention, the tiling principles are applied to de Bruijn topologies.

DETAILED DISCUSSION

Preferred embodiments of the invention provide massively parallel computer systems in which processor nodes are interconnected in a Kautz-like topology. Preferred embodiments provide a computing system having O nodes (i.e., order O) equally divided on M modules, each module having N nodes, N=O/M. By appropriately selecting the size N of the module and appropriately selecting the specific set of nodes to be included on a module, the inter-node routing problem may be significantly reduced. Specifically, the inter-node routing may be arranged so that a high percentage of the inter-node connections or links may remain on a module (i.e., intra-module) and avoid inter-module connections, thus reducing the amount of inter-node connections that must involve a backplane, cables, or the like. Moreover, the inter-node connections that must be inter-module (and thus require a backplane or cables, or the like) may be arranged in a parallel fashion. These features facilitate the creation of larger systems and yield inter-node connections with shorter paths and latencies. That is, preferred embodiments provide efficient and effective logical routing (i.e., the number of hops between nodes) and also provide efficient and effective physical routing (i.e., allowing high-speed interconnect to be used on large systems).

Certain embodiments of the invention use a Kautz topology for data links and data flow to interconnect the node, but they are not purely directed graphs because they include a control link back channel link from receiver to sender. This link is used for flow control and status, among other things.

Kautz interconnection topologies are unidirectional, directed graphs (digraphs). Kautz digraphs are characterized by a degree k and a diameter n. The degree of the digraph is the maximum number of arcs (or links or edges) input to or output from any node. The diameter is the maximum number of arcs that must be traversed from any node to any other node in the topology.

The order O of a graph is the number of nodes it contains. The order of a Kautz digraph is $(k+1)k^{n-1}$. The diameter of a Kautz digraph increases logarithmically with the order of the graph.

Figure 1A:
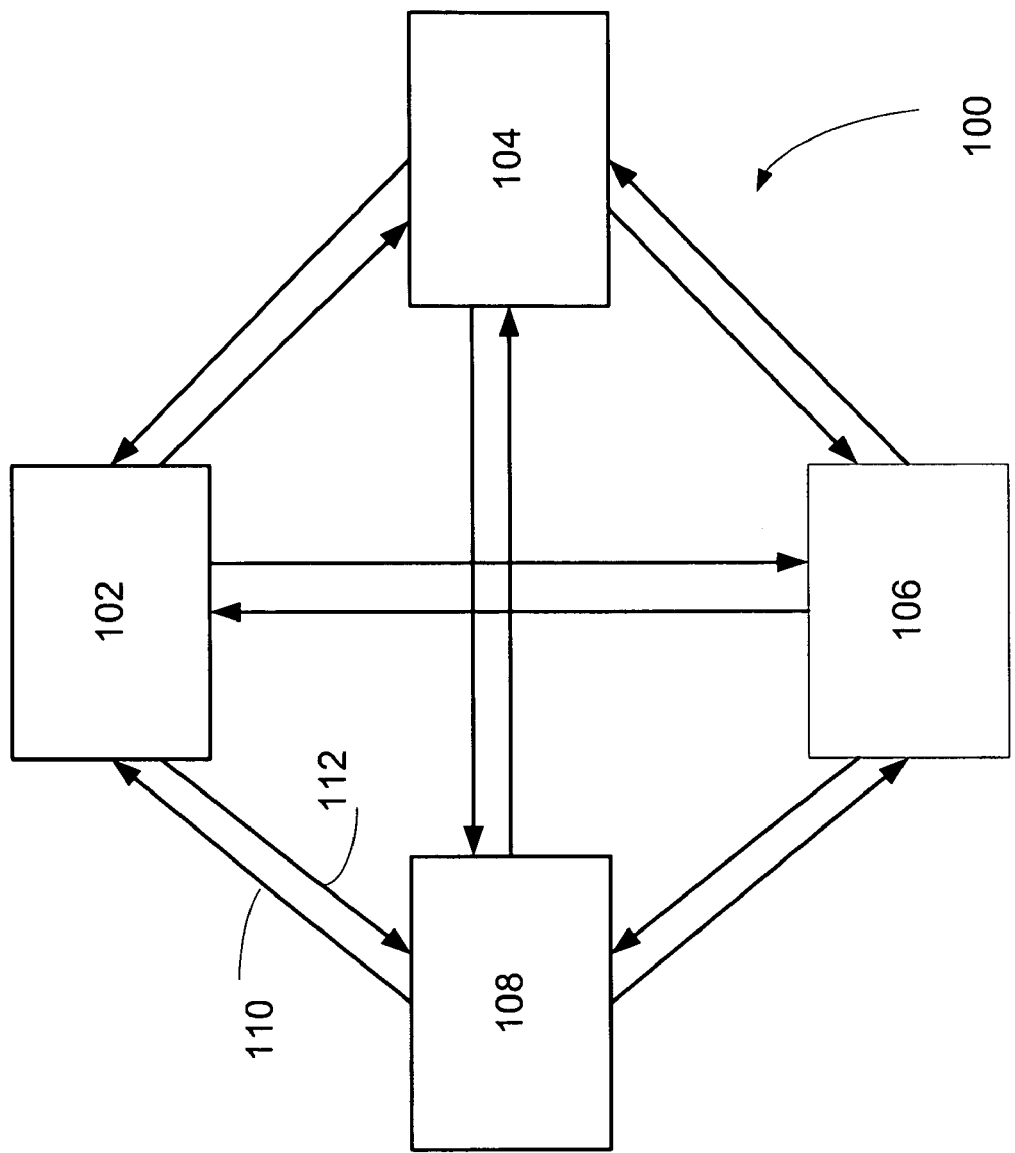
FIGS. 1A-C depict Kautz topologies of various order, degree and diameter.

FIG. 1A depicts a very simple Kautz topology for descriptive convenience. The system 100 has degree three; that is, each node has three ingress links 110 and three egress links 112. The topology has diameter one, meaning that any node can communicate with any other node in a maximum of one hop. The topology is order 4, meaning that there are 4 nodes.

Figure 1B:
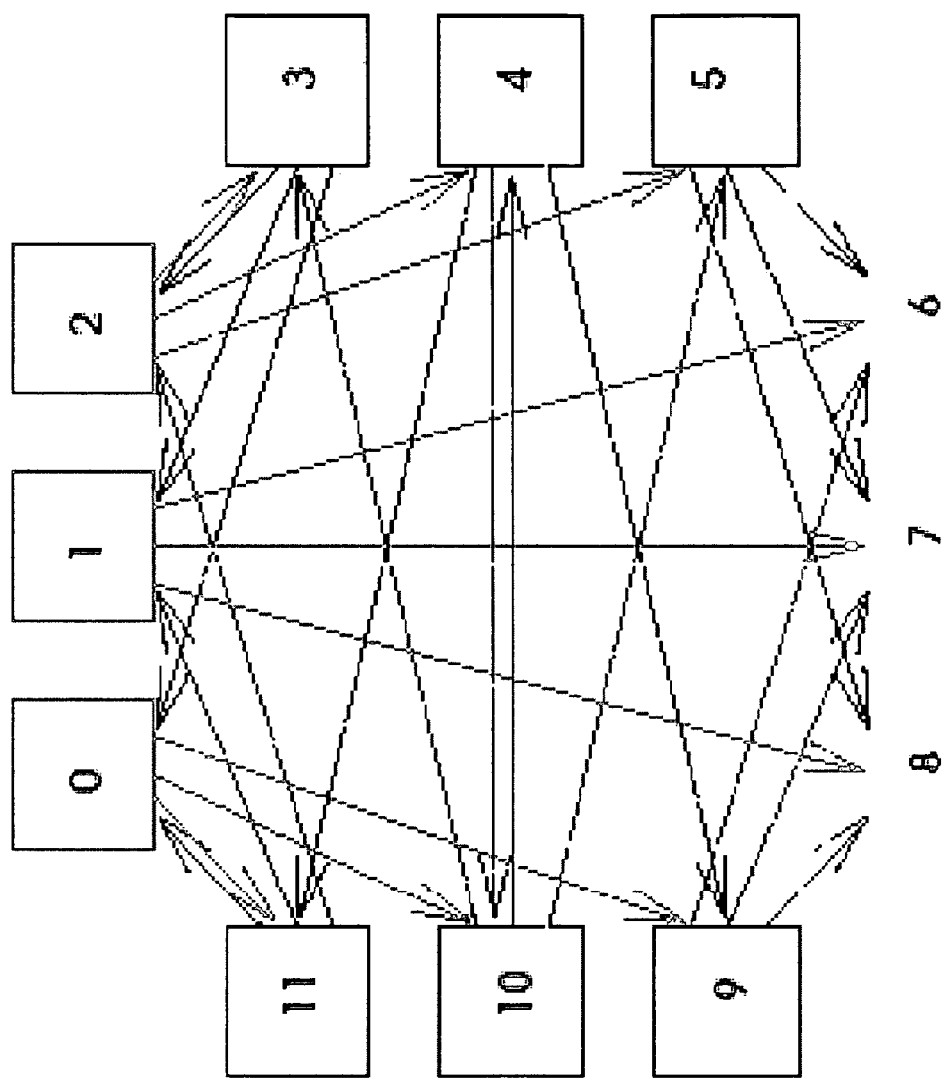
Figure 1C:
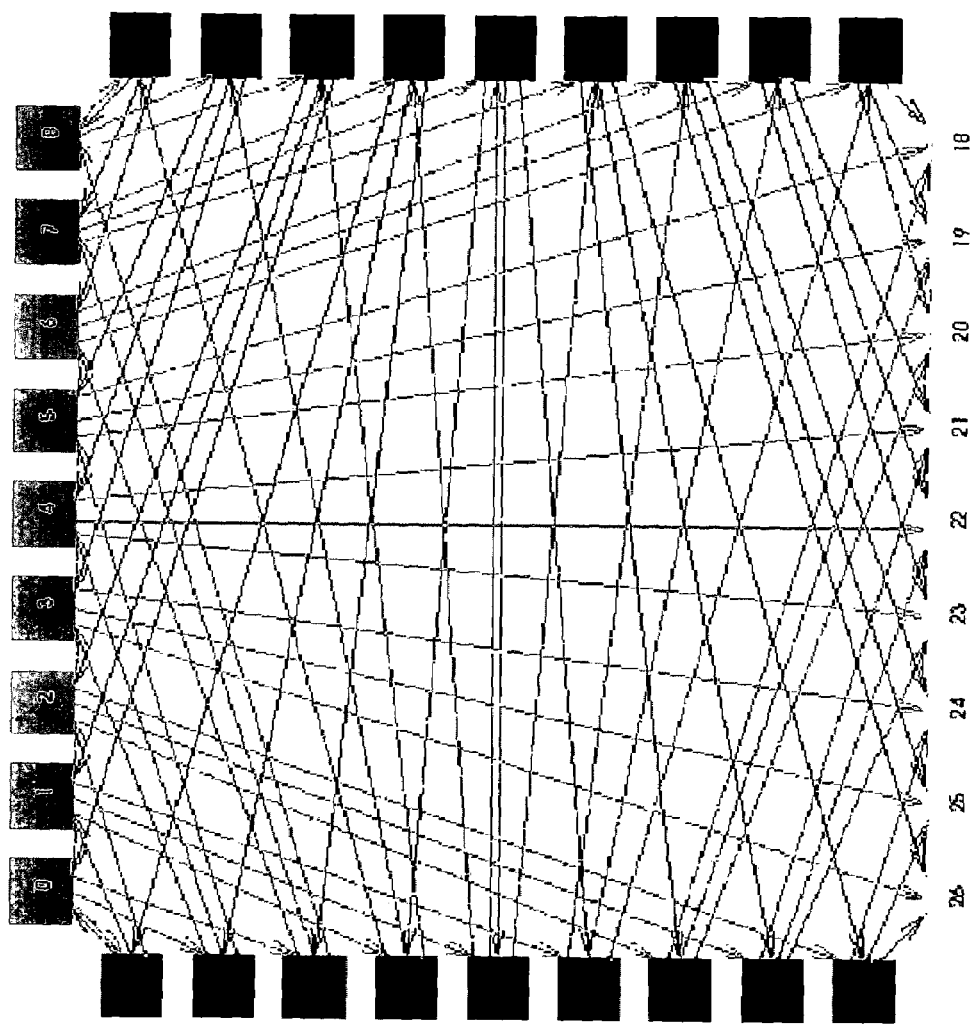

FIG. 1B shows a system that is order 12 and diameter two. By inspection, one can verify that any node can communicate with any other node in a maximum of two hops. FIG. 1C shows a system that is degree three and diameter three, having order 36. One quickly sees that the complexity of the system grows quickly. It would be counter-productive to depict and describe preferred systems such as those having hundreds of nodes or more.

The table below shows how the order O of a system changes as the diameter n grows for a system of fixed degree k.

|  | Order | | |
| --- | --- | --- | --- |
| Diameter (n) | k = 2 | k = 3 | k = 4 |
| 3 | 12 | 36 | 80 |
| 4 | 24 | 108 | 320 |
| 5 | 48 | 324 | 1280 |
| 6 | 96 | 972 | 5120 |

With nodes numbered from zero to O−1, the digraph can be constructed by running a link from any node x to any other node y that satisfies the following equation:

$$y = (-x*k - j) \bmod O, \text{ where } 1 \leq j \leq k \quad (1)$$

Thus, any (x,y) pair satisfying (1) specifies a direct egress link from node x. For example, with reference to FIG. 1C node 1 has egress links to the set of nodes 30, 31 and 32. Iterating through this procedure for all nodes in the system will yield the interconnections, links, arcs or edges needed to satisfy the Kautz topology. (As stated above, communication between two arbitrarily selected nodes may require multiple hops through the topology but the number of hops is bounded by the diameter of the topology.)

Under certain embodiments of the invention, the system is arranged into multiple modules. The modules are created to have a particular size (i.e., number of nodes on the module) and a particular set of nodes on the module. It has been observed by the inventors that careful selection of the module size and careful attention to the selection of the set of nodes to include on a given module can significantly reduce wiring problems in systems built with the Kautz topology.

More specifically, under preferred embodiments of the invention, the Kautz topology is uniformly tiled. To do this, the Kautz graph is one-to-one mapped to satisfy the following equation.

$$t: V_G \rightarrow I \times V_T \qquad (2)$$

In the above, $V_G$ is the set of vertices of a Kautz graph; $V_T$ is the set of vertices of a tile (i.e., a smaller graph, implemented as a module of nodes); and I is an index set. Moreover, if (x,y) is an edge within tile T then $(t^{-1}(i,x), t^{-1}(i,y))$ is an edge of Kautz graph G.

The tiles or modules are arranged to maximize the number of edges of the tile T. That is, the tiles or modules are arranged so that a maximum number of edges, arc, or links in the Kautz topology are contained on the tiles. All the remaining edges by necessity are inter-tile (or inter-module). By doing this, node interconnections will be maximized to remain intra-module.

Conventionally a Kautz graph of degree k and diameter n can label the vertices of the topology as follows, with each integer s being base k+1. Adjacent integers must differ.

$$s_1 s_2 \ldots s_n \in Z_{k+1}^n, \; s_i \neq s_{i+1} \qquad (3)$$

A de Bruijn graph is closely related to a Kautz graph. A de Bruijn graph has vertices that may be labeled by strings of n integers base k, as follows:

$$c_1 c_2 \ldots c_n \in Z_k^n \qquad (4)$$

The vertices of a degree k, diameter n Kautz graph can be mapped to the vertices of a degree k, diameter n−1 de Bruijn graph as follows:

$$T: s_1 \ldots s_n \rightarrow c_1 \ldots c_{n-1}, \; c_i = (s_{i+1} - s_i)(\bmod k+1) - 1 \qquad (5)$$

Consequently, the edges, links or arcs in a Kautz graph may be expressed as follows:

$$(s_0 c_1 c_2 \ldots c_{n-1}, [s_0 + c_1 + 1] c_2 c_3 \ldots c_n) \qquad (6)$$

where $[s_0 + c_1 + 1]$ is taken modulo k+1.

To make the tiling scalable to arbitrary diameter graphs, the tile M must be equivalent to a subgraph of a de Bruijn graph of diameter m and degree k containing all the nodes of the de Bruijn graph but only a subset of the edges subject to the condition that the edges on the tile cannot form any directed loops. In order to minimize inter-module wiring, the subgraph with the maximal number of intra-module edges (without directed loops) should be chosen subject to the condition that the tile can be extended to form a complete tiling of the system.

To generate a complete tiling, it is possible to use a map Π: G→M from the nodes of the complete graph G to the nodes of the tile M which respects the edge structure of the de Bruijn graph of diameter m on which the tile is based. This map may in particular be chosen to satisfy the following conditions:

$$\Pi(P(u)) \; P(\Pi(u)), \; \forall u \in G$$

$$\Pi(C(u)) - C(\Pi(u)), \; \forall u \in G$$

where C(u) denotes the set of nodes which are reached from edges beginning at node u and P(u) denotes the set of nodes from which node u can be reached by following a single edge.

Under certain embodiments of the invention, each module has $k^m$ nodes, and each node on the module can be assigned a label $d_1 \ldots d_m \in Z_k^m$ such that inter-node connections that are intra-module correspond to a subset of the edges $(d_1 \ldots d_m, d_2 \ldots d_{m+1})$ of a de Bruijn graph of diameter m and degree k, subject to the condition that there are no directed closed loops formed from the inter-node connections on a module.

Under certain embodiments of the invention, maps Π satisfying the conditions stated above for P(u) and C(u) may be defined by expressing $d_i$'s as a "discrete differential" function of node labels the $s_0 \ldots s_n$ of the Kautz graph through $$d_i = f(c_{i+n-m}, c_i) \qquad (7)$$

wherein f(x,y) is a function which for fixed X acts a permutation on $Z_k$ through $y \rightarrow f(X,y)$ and which for fixed Y acts as a permutation on $Z_k$ through $x \rightarrow f(x,Y)$ and where $c_i$'s encode the Kautz coordinates $s_i$ through $$c_i = s_i - s_{i-1} - 1 \bmod(k+1) \qquad (8)$$

Under certain embodiments, f(x,y) equals x+y mod k, or f(x,y) equals x−y mod k.

Given a map Π with the conditions defined above, the tiling may then be defined as follows. Choose a vertex $x_o = d_1 \ldots d_{N-n}$ of the tile (or module) T. Associated with this vertex of T is a set of vertices in the larger Kautz graph each of which has the same value of $\Pi(u) = x_o$. Define the index set by the remaining indices on this set of vertices (i.e., $s_0 c_1 \ldots c_n$). This defines $t^{-1}(i, x_o)$ for all i. If there are any edges in T containing $x_o$ the definition is extended. For example, consider if T contains the edge $(x_o, x_1)$. For each i in I, there is a unique vertex in the Kautz graph which is reached by an edge from $t^{-1}(i, x_o)$ and which has $d_1 \ldots d_{N-n} = x_1$. Define this vertex to be $t^{-1}(i, x_1)$. Continue in the same way for further edges containing either $x_0$ or $x_1$. Each time a new edge is included the map $t^{-1}$ is defined for the new value of x. In this fashion the complete tiling may be completed.

Tiling constructed in the fashion of the previous discussion automatically have the parallel routing property. The benefits of parallel routing are described below.

Figure 1D:
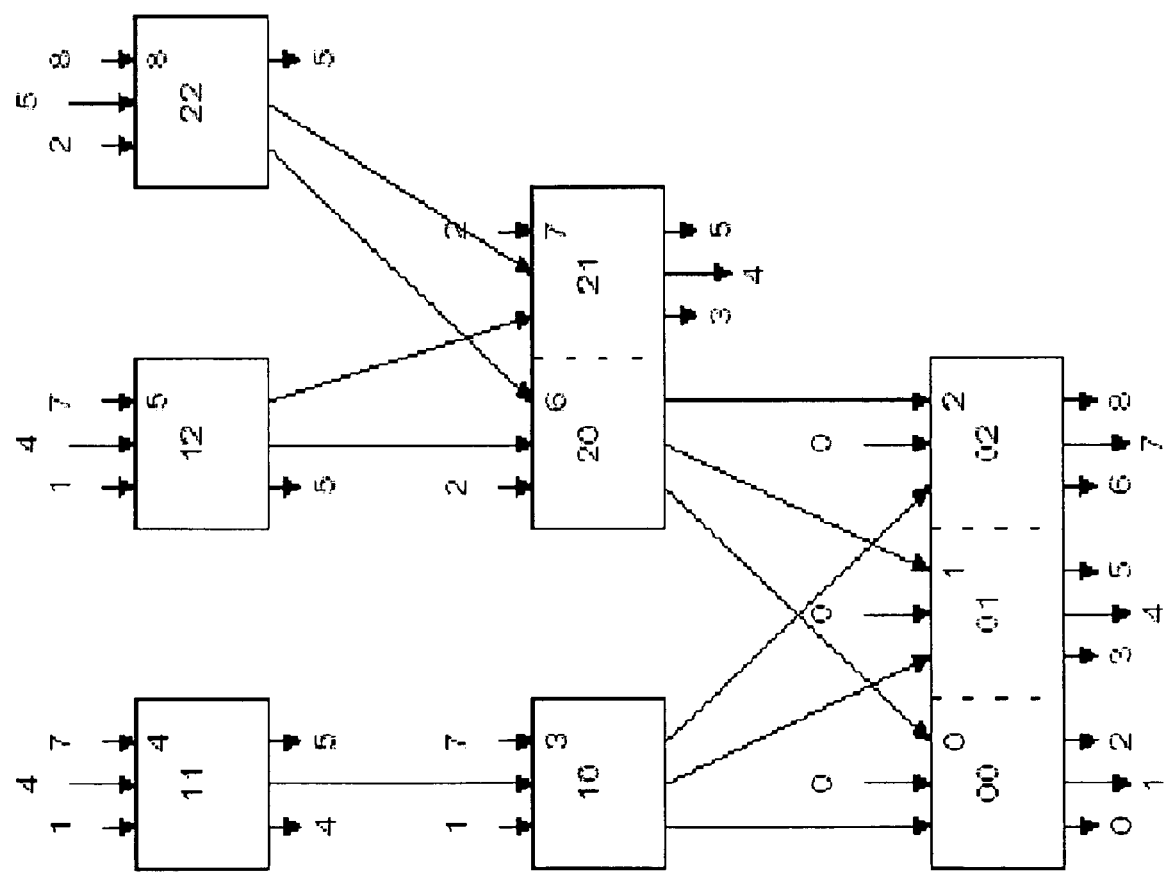
FIG. 1D depicts a module tiling of an embodiment of the invention to illustrate module interconnectivity.

FIG. 1D for example shows a module or tile for a very simple Kautz topology of order 36 and degree three. Each module has nine nodes, as depicted.

The table shows how the nodes and modules connect. Notice how the linear labels are distributed among modules. For example, linearly labeled nodes 0-9 are not all assigned to module 0. As mentioned above the interconnection among nodes is defined by equation 1, and the assignment among modules is a result of the tiling method employed. This example of FIG. 1D is particularly simple in comparison to the larger systems of preferred embodiments. The size of preferred embodiments is prohibitively large to depict by figures or tables and instead is explained by the mathematics above. This example is utilized to illustrate the complexity of module assignment and the interconnections among nodes.

| Linear label | Exits | | | Shift Register label | | | map to deBruijn | | | Assignment | |
|---|---|---|---|---|---|---|---|---|---|---|---|
| | 0 | 1 | 2 | s0 | s1 | s2 | s0 | c1 | c2 | mod | node |
| 0 | 35 | 34 | 33 | 0 | 3 | 0 | 0 | 2 | 0 | 0 | 6 |
| 1 | 32 | 31 | 30 | 0 | 3 | 1 | 0 | 2 | 1 | 0 | 7 |
| 2 | 29 | 28 | 27 | 0 | 3 | 2 | 0 | 2 | 2 | 3 | 8 |
| 3 | 26 | 25 | 24 | 0 | 2 | 3 | 0 | 1 | 0 | 3 | 3 |
| 4 | 23 | 22 | 21 | 0 | 2 | 0 | 0 | 1 | 1 | 1 | 4 |
| 5 | 20 | 19 | 18 | 0 | 2 | 1 | 0 | 1 | 2 | 2 | 5 |
| 6 | 17 | 16 | 15 | 0 | 1 | 2 | 0 | 0 | 0 | 1 | 0 |

-continued

| Linear label | Exits 0 | Exits 1 | Exits 2 | Shift Register label s0 | Shift Register label s1 | Shift Register label s2 | map to deBruijn s0 | map to deBruijn c1 | map to deBruijn c2 | Assignment mod | Assignment node |
|---|---|---|---|---|---|---|---|---|---|---|---|
| 7  | 14 | 13 | 12 | 0 | 1 | 3 | 0 | 0 | 1 | 1 | 1 |
| 8  | 11 | 10 | 9  | 0 | 1 | 0 | 0 | 0 | 2 | 1 | 2 |
| 9  | 8  | 7  | 6  | 1 | 0 | 1 | 1 | 2 | 0 | 1 | 6 |
| 10 | 5  | 4  | 3  | 1 | 0 | 2 | 1 | 2 | 1 | 1 | 7 |
| 11 | 2  | 1  | 0  | 1 | 0 | 3 | 1 | 2 | 2 | 0 | 8 |
| 12 | 35 | 34 | 33 | 1 | 3 | 0 | 1 | 1 | 0 | 0 | 3 |
| 13 | 32 | 31 | 30 | 1 | 3 | 1 | 1 | 1 | 1 | 2 | 4 |
| 14 | 29 | 28 | 27 | 1 | 3 | 2 | 1 | 1 | 2 | 3 | 5 |
| 15 | 26 | 25 | 24 | 1 | 2 | 3 | 1 | 0 | 0 | 2 | 0 |
| 16 | 23 | 22 | 21 | 1 | 2 | 0 | 1 | 0 | 1 | 2 | 1 |
| 17 | 20 | 19 | 18 | 1 | 2 | 1 | 1 | 0 | 2 | 2 | 2 |
| 18 | 17 | 16 | 15 | 2 | 1 | 2 | 2 | 2 | 0 | 2 | 6 |
| 19 | 14 | 13 | 12 | 2 | 1 | 3 | 2 | 2 | 1 | 2 | 7 |
| 20 | 11 | 10 | 9  | 2 | 1 | 0 | 2 | 2 | 2 | 1 | 8 |
| 21 | 8  | 7  | 6  | 2 | 0 | 1 | 2 | 1 | 0 | 1 | 3 |
| 22 | 5  | 4  | 3  | 2 | 0 | 2 | 2 | 1 | 1 | 3 | 4 |
| 23 | 2  | 1  | 0  | 2 | 0 | 3 | 2 | 1 | 2 | 0 | 5 |
| 24 | 35 | 34 | 33 | 2 | 3 | 0 | 2 | 0 | 0 | 3 | 0 |
| 25 | 32 | 31 | 30 | 2 | 3 | 1 | 2 | 0 | 1 | 3 | 1 |
| 26 | 29 | 28 | 27 | 2 | 3 | 2 | 2 | 0 | 2 | 3 | 2 |
| 27 | 26 | 25 | 24 | 3 | 2 | 3 | 3 | 2 | 0 | 3 | 6 |
| 28 | 23 | 22 | 21 | 3 | 2 | 0 | 3 | 2 | 1 | 3 | 7 |
| 29 | 20 | 19 | 18 | 3 | 2 | 1 | 3 | 2 | 2 | 2 | 8 |
| 30 | 17 | 16 | 15 | 3 | 1 | 2 | 3 | 1 | 0 | 2 | 3 |
| 31 | 14 | 13 | 12 | 3 | 1 | 3 | 3 | 1 | 1 | 0 | 4 |
| 32 | 11 | 10 | 9  | 3 | 1 | 0 | 3 | 1 | 2 | 1 | 5 |
| 33 | 8  | 7  | 6  | 3 | 0 | 1 | 3 | 0 | 0 | 0 | 0 |
| 34 | 5  | 4  | 3  | 3 | 0 | 2 | 3 | 0 | 1 | 0 | 1 |
| 35 | 2  | 1  | 0  | 3 | 0 | 3 | 3 | 0 | 2 | 0 | 2 |

Under preferred embodiments, module size is an integral power of the degree (k). Certain embodiments maximize this size as described above, i.e., largest subgraph without directed loops, but others may be smaller for practical considerations in building modules. These are substantially optimal in terms of maximizing edges to be intra-module.

Certain embodiments use a module size of 27 nodes where each node is of degree 3. Each module has a particular set of nodes thereon (as described above) and may be used to build Kautz topologies of 108, 324, 972 or more nodes, or de Bruijn topologies with multiples of 27 nodes.

Figure 2:
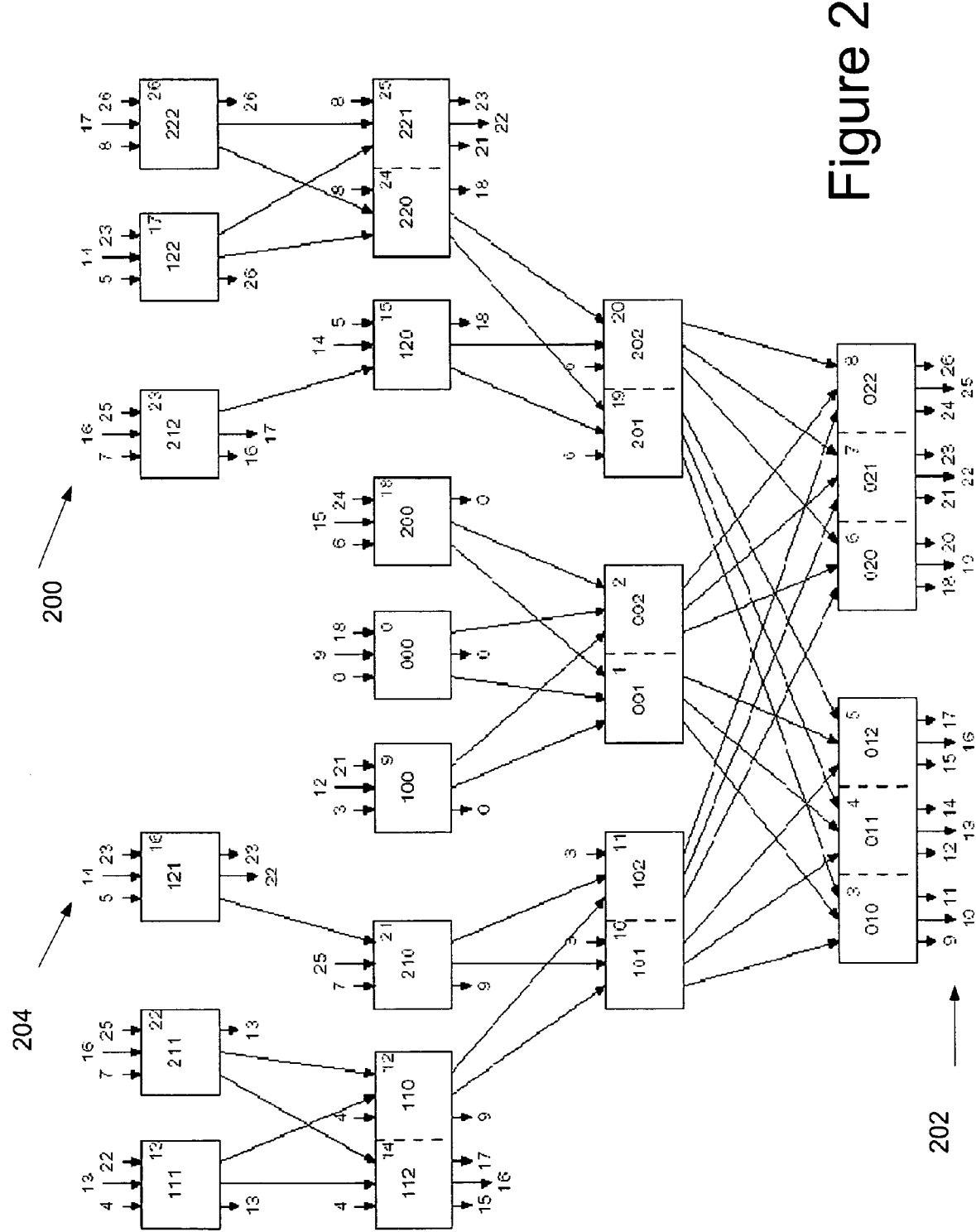
FIG. 2 depicts a module containing a plurality of nodes according to certain embodiments of the invention.

FIG. 2 depicts a module arrangement having 27 nodes, numbered 0 through 26 in the upper right corner of nodes. These node numbers are, in certain embodiments, the numbering schema of equations 7 and 8. That is, the node numbers shown are adjacent in the number space provided by the discrete differential numbering scheme outlined above, though they need not be adjacent in the numbering of nodes of the Kautz topology as expressed in equation 1. The node identifier is expressed in the upper right corner of the node in decimal form, and in the middle of the node it is expressed in ternary form.

As illustrated, each node identifies the egress links 202 and ingress links 204. Focusing on egress links for the time being (with the explanation extending to ingress links too), node 7 has egress links going to nodes 21, 22, and 23 (upper right notation, i.e., node identifier) on other modules in the system. The figure depicts just the numbering scheme and not the node identification within the Kautz topology. As mentioned above, the actual interconnectivity is defined by equation 1. Thus, some connections depicted on FIG. 2 identify node numbers (via its number identifier), which are the same, even though in the larger system the node numbers will go to different nodes. For example, the figure shows nodes 17, 26 and 8, each with output links to another node (off module) identified by number 26. However, the node 26 driven by nodes 17 and 26 (upper right of FIG. 2) is on a different module than the node 26 driven by node 8. The actual nodes involved are governed by the above equations.

Figure 4:
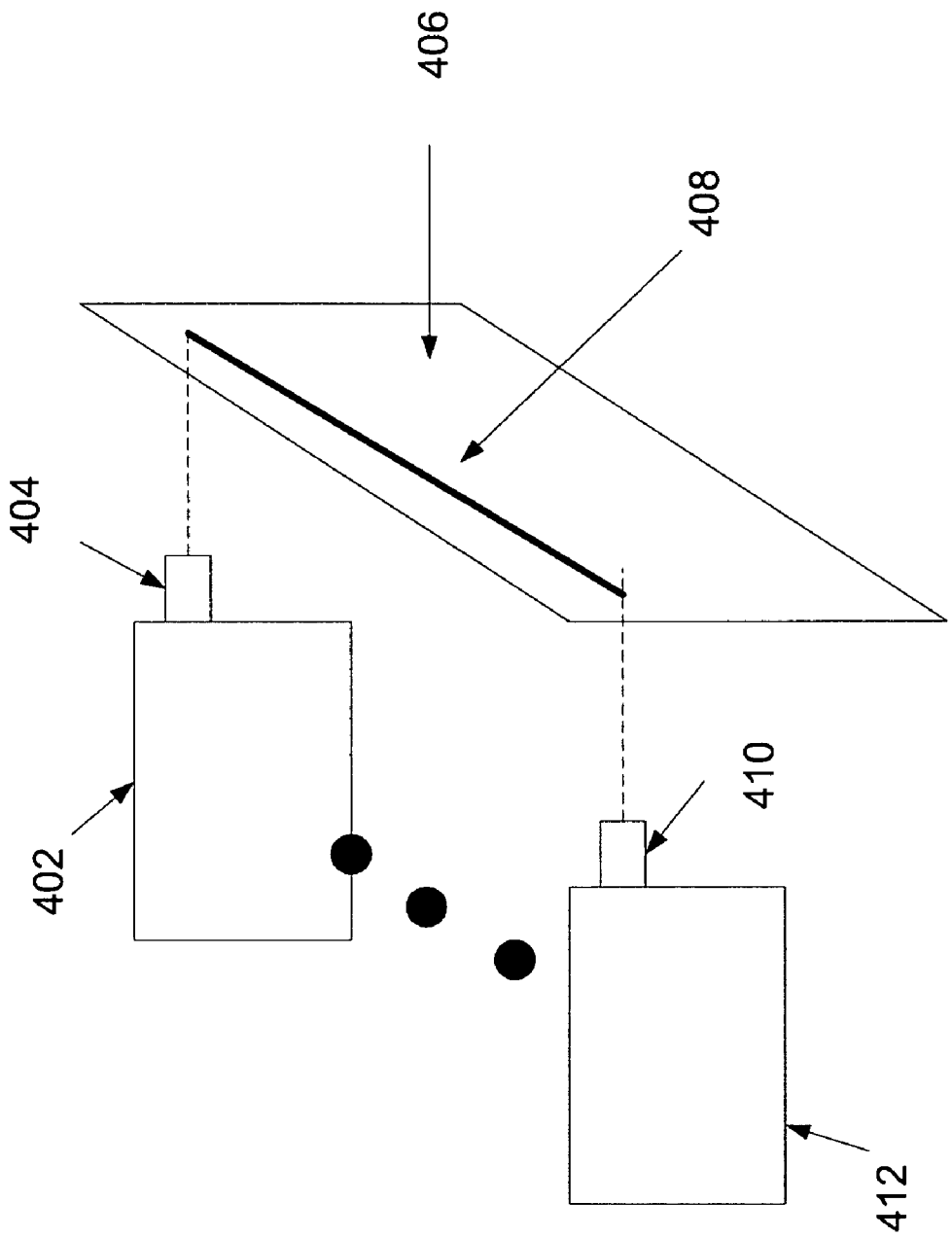
FIG. 4 illustrates parallel routing of inter-module signals according to certain embodiments of the invention.

FIG. 4 depicts a simplified diagram, drawn in perspective, to illustrate the parallel routing that results from the tiling approach discussed above. A first module 402 has an output pin 404 in communication with backplane trace 408 on backplane 406. (A backplane layer is illustrated, but other structures such as midplanes or the like may be used.) The trace 408 is parallel and horizontal to pin 410 on module 412. That is, the backplane trace has no vertical runs. Under preferred embodiments of the invention, every backplane run will be parallel in a similar manner. Though many layers may be needed for the backplane when there are a significant number of modules, the backplane traces will not need vertical runs to connect the relevant pins and links, and instead runs will be horizontal and parallel. (Alternatively if things were rotated the runs could all be vertical and parallel.) This routing greatly facilitates the ability to keep high signal integrity, which in turn greatly improves the ability to run the inter-node and inter-module connections at very high speed. It also enables larger systems to be built while maintaining satisfactory signal integrity (i.e., designs don't need to decrease bus speed to enable large systems). Using the example of FIG. 2, the trace 408 may correspond to the connection from the node with discrete differential number 5 (lower part of figure) to another node on a different module (412) with discrete differential identifier 17. Notice in the upper right of FIG. 2 that every node 17 receives an input from another node 5 (discrete differential number). In certain embodiments, such as a 972 node system with modules like that shown in FIG. 2, each module will have 39 pins (e.g., 404 and 410), and every backplane trace will run horizontal and parallel to other traces. Only one backplane layer 406 is shown in FIG. 4 for clarity, but a system of 972 nodes may require about 20 such layers. Such a backplane, however, will be faster and have better signal integrity than one that did not have parallel routes and which needed vertical runs, vias and the likes to provide connectivity among modules.

Referring back to FIG. 2, Each node on the system may communicate with any other node on the system by appropriately routing messages onto the communication fabric via an egress link 202. Some of these egress links will be inter-module, such as the ones depicted in connection with node 7. Others will be intra-module, such as those being depicted in connection with node 2 which go to nodes 6, 7, and 8 on the same module. Some nodes have some links intra-module and some inter-module, see for example node 12.

Under certain embodiments, any data message on the fabric includes routing information in the header of the message (among other information). The routing information specifies the entire route of the message. In certain degree three embodiments, the routing information is a bit string of 2-bit routing codes, each routing code specifying whether a message should be received locally (i.e., this is the target node of the message) or identifying one of three egress links. Naturally other topologies may be implemented with different routing codes and with different structures and methods under the principles of the invention. Under certain embodiments, each node has tables programmed with the routing information. For a given node x to communicate with another node z, node x accesses the table and receives a bit string for the routing information. As will be explained below, this bit string is used to control various switches along the message's route to node z, in effect specifying which link to utilize at each node during the route. Another node j may have a different bit string when it needs to communicate with node z, because it will employ a different route to node z and the message may utilize different links at the various nodes in its route to node z. Thus, under certain embodiments, the routing information is not literally an "address" (i.e., it doesn't uniquely identify node z) but instead is a set of codes to control switches for the message's route.

Under certain embodiments, the routes are determined a priori based on the interconnectivity of the Kautz topology as expressed in equation 1. That is, the Kautz topology is defined, and the various egress links for each node are assigned a code (i.e., each link being one of three egress links). Thus, the exact routes for a message from node x to node z are known in advance, and the egress link selections may be determined in advance as well. These link selections are programmed as the routing information. These tables may be reprogrammed as needed, for example, to route around faulty links or nodes.

Certain embodiments modify the routing information in the message header en route for easier processing. For example, a node will analyze a 2 bit field of the routing information to determine which link the message should use, e.g., one of three egress links or it should be kept local (i.e., this is the destination node). This could be the least significant numeral, digits or bits of the routing field, but it need not be limited to such (i.e., it depends on the embodiment). Once a node determines that a message should be forwarded on one of the egress links, the node shifts the routing bit string accordingly (e.g., by 2 bits) so the next node in the route can perform an exactly similar set of operation: i.e., process the lowest two bits of the route code to determine if the message should be handled locally or forwarded on a specific one of three egress links).

The routing information, in these embodiments, is used to identify portions in a cross point buffer to hold the data so that the message may be stored until it may be forwarded on the appropriate link. (Certain embodiments support cut-through routing to avoid the buffer if the appropriate link is not busy when the message arrive or becomes free during reception of the message.)

In certain embodiments, the messages also contain other information such as virtual channel identification information. As explained in more detail in the related and incorporated applications, virtual channel information is used so that each link may be associated with multiple virtual channels and so that deadlock avoidance techniques may be implemented.

Experimentation shows that with a preferred arrangement 48% of the inter-node links may be routed inter-module, and 52% can be routed intra-module. Other degrees, diameters, orders, and modules sizes may be used using the principles of the invention.

Figure 3:
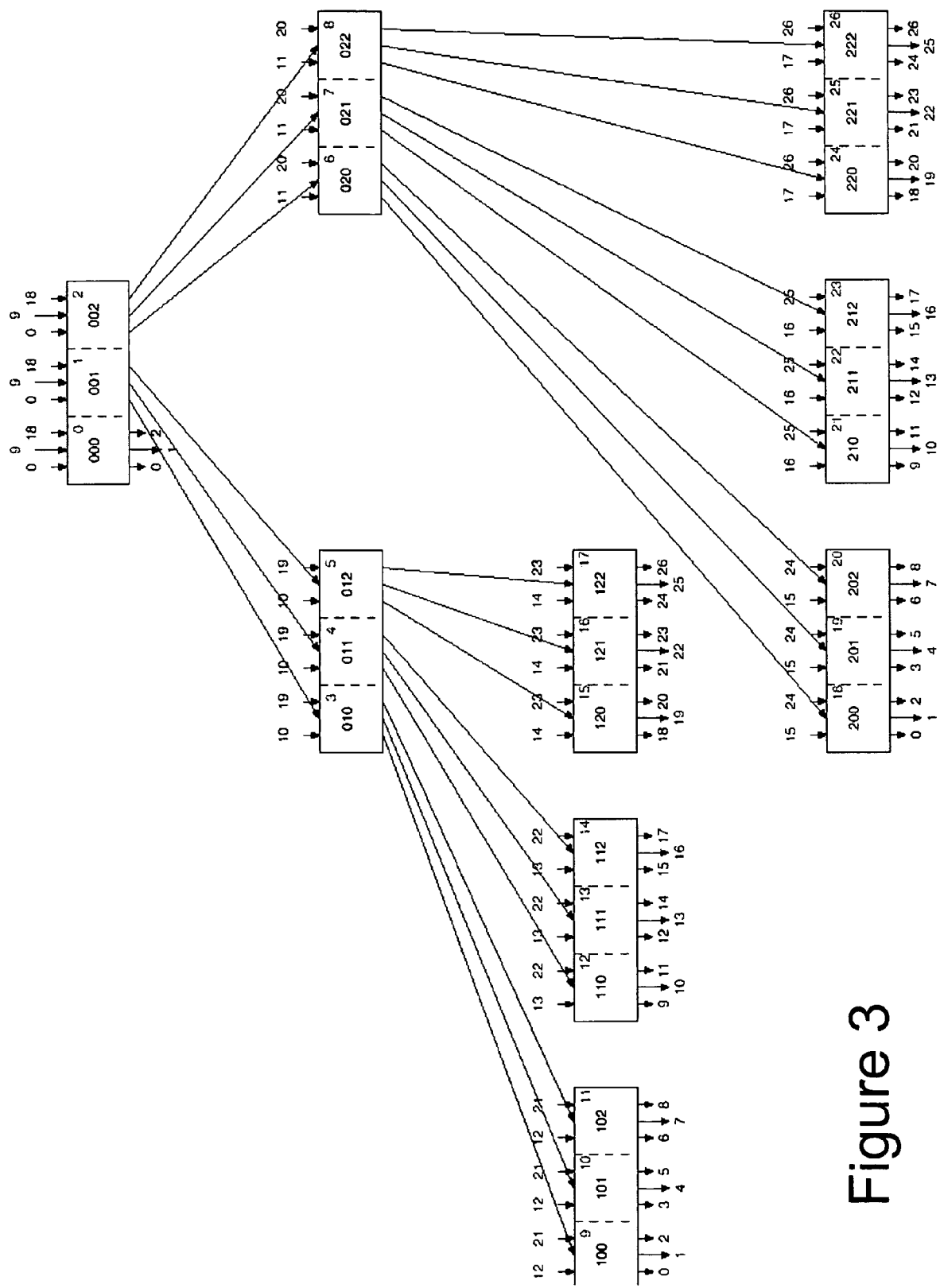
FIG. 3 depicts a module tiling with inferior inter-module connectivity.

In contrast, other methods of selecting nodes may yield significantly less intra-module connections (and as a result more inter-module connections). FIG. 3 for example shows an arrangement also involving 27 nodes per module. However, even though the arrangement seems well-organized (e.g., tree like) only about 30% of the inter-node connections remains on module, meaning more of the inter-node connections will require a backplane or the like, inhibiting the ability to build larger systems.

Under certain embodiments the computing system is not configured as a Kautz digraph in pure form in that the communication is not purely unidirectional. Instead, certain preferred embodiments have data communication implemented on unidirectional directed links (or circuits) and use a back channel control link (or circuit) for flow control and maintenance purposes.

Figure 5:
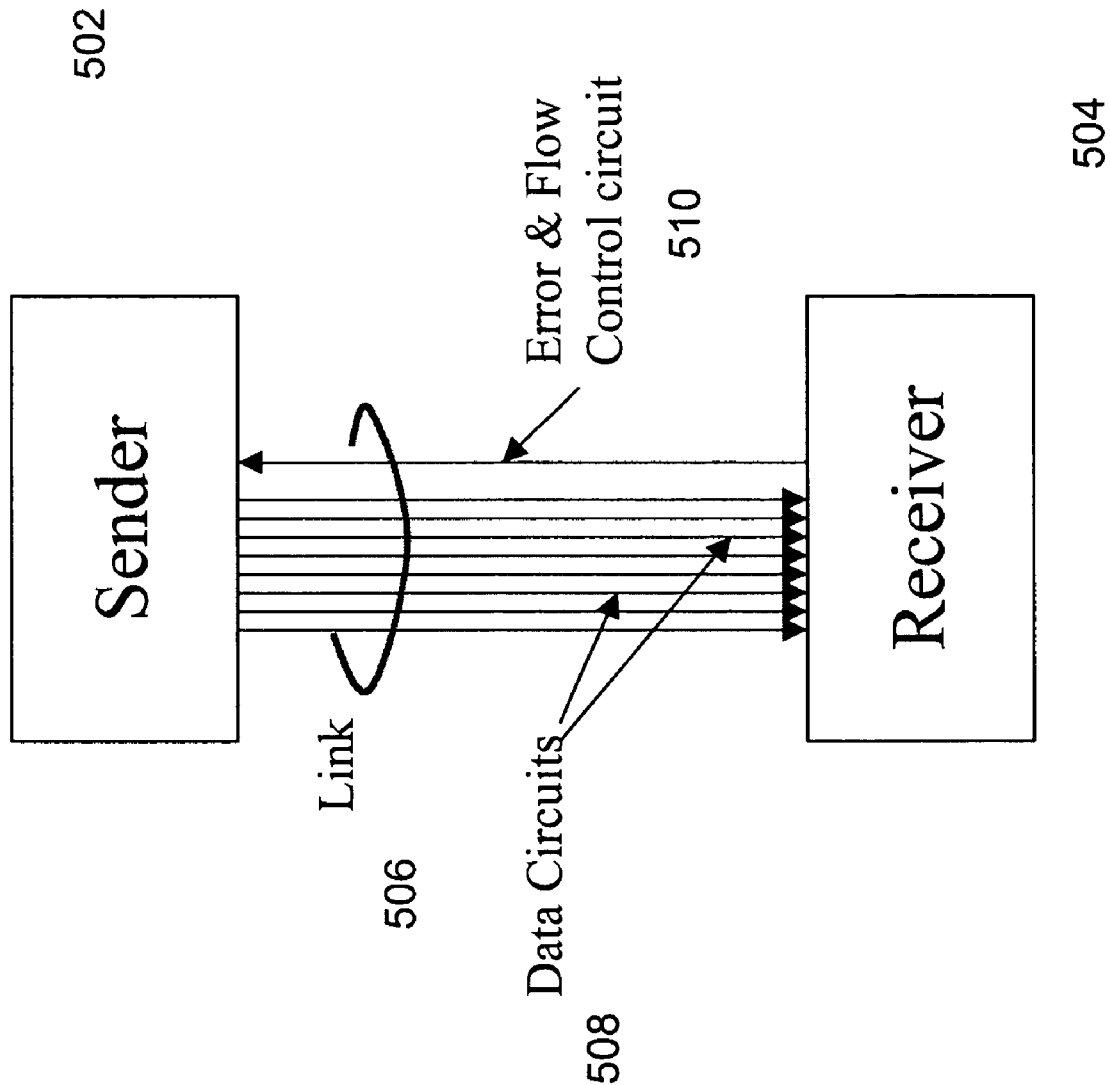
FIG. 5 depicts data and control links for an inter-node link or connection according to certain embodiments of the invention.

FIG. 5 for example shows two nodes, sender 502 and receiver 504, following the unidirectional convention used above in discussing Kautz topologies. These nodes could correspond, for example, to two intra-module nodes such as nodes 18 and 2 in FIG. 2. The link 506 connecting the two nodes includes unidirectional data lanes 508 and unidirectional control lanes 510. The direction of the data lanes 508 is consistent with the convention used above in discussing the unidirectional flow of the Kautz digraph. The direction of the control link is in the opposite direction, i.e., from data receiving node 504 to data transmitting node 502. The arrangement is asymmetric in the sense that there are more forward data lane circuits than there are reverse control lane circuits. In certain embodiments there are eight data circuits and one control circuit between two connected nodes.

In certain embodiments each sender 502 assigns a link sequence number (LSN) to every outgoing packet. The LSN is included in the packet header. The sender 502 also keeps transmitted packets in a replay buffer until it has been confirmed (more below) that the packets have been successfully received.

Receiver nodes receive packets and keep track of the LSN of the most recently received error free packet as part of its buffer status. Periodically, the receiver node 504 transmits buffer status back to the sender using the control circuit 510. In certain embodiments, this status is transmitted as frequently as possible. The LSN corresponds to the most recently received packet if there has been no error. If there has been an error detected, the buffer status will indicate error and include the LSN of the last packet correctly received.

In response the sending node 502 identifies the LSN in the buffer status packet and from this realizes that all packets up to and including the identified LSN have been received at the receiving node 504 in acceptable condition. The sender 502 may then delete packets from the replay buffer with LSNs up to and including the LSN received in the status packet. If an error has been detected, the sender will resend all packets in the replay buffer starting after the LSN of the buffer status (the receiving node will have dropped such in anticipation of the replay and to ensure that all packets from the same source, going to the same destination, along the same route, with the same virtual channel are delivered and kept in order). Thus, packet error detection and recovery is performed at the link level. Likewise packets are guaranteed to be delivered in order at the link-level.

The control circuits are also used to convey buffer status information for downstream nodes to indicate whether buffer space associated with virtual channels are free or busy. As is explained in the incorporated patent applications, the nodes use a cross point buffer to store data from the links and to organize and control the data flow as virtual channel assignments over the links to avoid deadlock. More specifically, a debit/credit mechanism is used in which the receiving node 504 informs the sending node 502 of how much space is available in the buffers (not shown) of the receiving node 504 for each virtual channel and port. Under certain embodiments a sender 502 will not send information unless it knows that there is buffer space for the virtual channel in the next downstream node along the route. The control packet stream carries a current snapshot of the cross point buffer entry utilization for each of the crosspoint buffers it has (which depends on the degree of the system).

The control link may also be used for out-of-band communication between connected nodes by using otherwise unused fields in the packet to communicate. This mechanism may be used for miscellaneous purposes.

In a Kautz network no single or (if degree three or higher) double failure can isolate any working node or subset of nodes from the rest of the network. No single link or node failure increases the network diameter by more than one hop. Certain embodiments of the invention use multiple paths in the topology to avoid congestion and faulty links or nodes.

Many of the teachings here may be extended to other topologies including de Bruijn topologies. Likewise, though the description was in relation to large-scale computing system, the principles may apply to other digital systems.

Certain embodiments used discrete differential in the low order positions of the label identification. This is particularly helpful for parallel routing.

The above discussion concerning Kautz tilings are applicable to de Bruijn topologies as well.

Certain embodiments of the invention allow what are above described as a tile to be combined on to module. For example, two tiles may be formed on a module, and a module under these arrangement will have $pk^m$ nodes where p is an integer.

Appendix A (attached) is a listing of a particular 972 node, 36 module, degree three system. The columns identify the Kautz number (0-971), the node identification (per module) and specify the other nodes to which each node connects. From this, one can determine node-to-node interconnectivity for each node in the system.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A scalable, multi-node computer system for providing efficient transmission of data amongst interconnected modules, the multi-node computer system comprising:
a plurality of computer nodes interconnected via a Kautz topology having order O, diameter n, and degree k;
wherein the order $O=(k+1)k^{n-1}$;
wherein interconnections from a computer node x to a computer node y in the topology satisfies a relationship $y=(-x*k-j) \mod O$, where $1 \leq j \leq k$; and
wherein the computer nodes are arranged onto a plurality of modules, each module of the plurality of modules having an equal number of computer nodes thereon.

2. The multi-node computer system of claim 1, wherein a majority of the inter-node connections are contained on the plurality of modules and a minority of the inter-node connections are inter-module connections.

3. The multi-node computer system of claim 1, wherein the amount of inter-node connections contained on the plurality of modules is optimal.

4. The multi-node computer system of claim 1, wherein a subset of the inter-node connections are inter-module connections and the subset routes data among modules on an inter-module connection plane.

5. A scalable, multi-node computer system for providing efficient transmission of data amongst interconnected modules, the multi-node computer system comprising:
a plurality of computer nodes interconnected via a Kautz topology having order O, diameter n, and degree k;
wherein the order $O=(k+1)k^{n-1}$;
wherein interconnections from a computer node x to a computer node y in the Kautz topology satisfy a relationship $y=(-x*k-j) \mod O$, where $1 \leq j \leq k$; and
wherein the plurality of computer nodes are arranged onto a plurality of modules;
wherein each module has $k^m$ nodes, and each node on the module is assigned a label $d_1 \ldots d_m \epsilon Z_k^m$ such that inter-node connections that are intra-module correspond to a subset of the edges $(d_1 \ldots d_m, d_2 \ldots d_m+_1)$ of a de Bruijn graph of diameter m and degree k, subject to a condition that there are no directed closed loops formed from the inter-node connections on a module.

6. The system of claim 5, wherein a number of intra-module connections is optimal.

7. The system of claim 5, wherein the $d_1$'s are expressed as a function of the node labels $S_0 \ldots S_n$ of the Kautz graph through $$d_i = f(c_i + n - m, c_i)$$

wherein f(x,y) is a function which for fixed X acts a permutation on $Z_k$ through $y \rightarrow f(X,y)$ and which for fixed Y acts as a permutation on $Z_k$ through $x \rightarrow f(x,Y)$ and where $c_i$'s encode the Kautz coordinates $S_i$ through $c_i = S_i - S_{i-1} - 1 \mod(k+1)$.

8. The system of claim 7, wherein f(x,y) equals $x+y \mod k$.

9. The system of claim 7, wherein f(x,y) equals $x-y \mod k$.

10. The system of claim 5, wherein each module is degree 3 and contains 27 computing nodes.

11. The system of claim 5, wherein a subset of the inter-node connections are inter-module connections and the subset routes data among modules on an inter-module connection plane.

* * * * *

UNITED STATES PATENT AND TRADEMARK OFFICE
CERTIFICATE OF CORRECTION

PATENT NO. : 7,660,270 B2 Page 1 of 1
APPLICATION NO. : 11/594416
DATED : February 9, 2010
INVENTOR(S) : Leonard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Thirtieth Day of November, 2010

David J. Kappos
*Director of the United States Patent and Trademark Office*